United States Patent
Aoki

(10) Patent No.: US 6,574,650 B1
(45) Date of Patent: Jun. 3, 2003

(54) PROGRAM GENERATION METHOD FOR CALCULATION OF A POISSON EQUATION, DIFFUSION EQUATION, OR LIKE PARTIAL DIFFERENTIAL EQUATION PERFORMED ON IRREGULARLY DISPERSED GRID POINTS

(75) Inventor: Takayuki Aoki, Kanagawa (JP)

(73) Assignee: Allied Engineering Corporation, Tokyo (JP)

( * ) Notice: Subject to any disclaimer, the term of this patent is extended or adjusted under 35 U.S.C. 154(b) by 0 days.

(21) Appl. No.: 09/461,818

(22) Filed: Dec. 16, 1999

(51) Int. Cl.[7] .................................................. G06F 7/38
(52) U.S. Cl. ...................................................... 708/446
(58) Field of Search ................................ 708/443, 444, 708/445, 446, 490; 703/3, 2; 706/50; 700/86; 716/20; 717/106

(56) References Cited

U.S. PATENT DOCUMENTS

| | | | | |
|---|---|---|---|---|
| 4,061,906 A | * | 12/1977 | Grebe et al. ................ | 708/446 |
| 4,734,879 A | | 3/1988 | Lin et al. ..................... | 364/810 |
| 4,759,759 A | * | 7/1988 | Walker et al. ............... | 623/2.16 |
| 4,819,161 A | * | 4/1989 | Konno et al. ................ | 228/103 |
| 4,927,068 A | * | 5/1990 | Naka et al. .................. | 716/20 |
| 5,129,035 A | * | 7/1992 | Saji et al. .................... | 700/86 |
| 5,450,568 A | * | 9/1995 | Saji et al. .................... | 623/2.16 |
| 5,699,271 A | * | 12/1997 | Sagawa et al. .............. | 717/106 |
| 5,966,524 A | * | 10/1999 | Burnett et al. ................ | 703/3 |
| 6,072,631 A | * | 6/2000 | Guenther et al. ............. | 706/50 |
| 6,173,276 B1 | * | 1/2001 | Kant et al. .................... | 700/86 |

OTHER PUBLICATIONS

Charles L. Fefferman, Existence and Smoothness of the Navier–Stokes Equation, May 1 2000, Princeton University, Department of Mathematics NJ, p. 1–5.*

T. Aoki, "Development of High Accurate CDF Solver with Boundaries given by CAD Geometry Data (DXF)," 12th Computational Fluid Dynamics Symposium, Japan Soc. of Comp. Fluid Dynamics (1998), pp. 321–322.

* cited by examiner

*Primary Examiner*—Chuong Dinh Ngo
*Assistant Examiner*—Chat C Do
(74) *Attorney, Agent, or Firm*—Paul A. Guss

(57) ABSTRACT

In order to provide an approximate solution having high accuracy to a given partial differential equation made up of one of a Poisson equation, diffusion equation or other partial differential equation similar in form to a Poisson or diffusion equation, the given equation being applied on a plurality of grid points dispersed at irregular intervals, a program is generated in which not only the dependent variable of the original equation is used, but in addition first order derivatives thereof also are input independently as additional dependent variables, the program thereby serving to execute and solve discretized equations using discretized expressions made up of high accuracy second and third order derivative terms of a dependent variable of the given partial differential equation.

14 Claims, 4 Drawing Sheets

PROGRAM GENERATION METHOD FOR CALCULATION OF A POISSON EQUATION, DIFFUSION EQUATION, OR LIKE PARTIAL DIFFERENTIAL EQUATION PERFORMED ON IRREGULARLY DISPERSED GRID POINTS

BACKGROUND OF THE INVENTION

1. Field of the Invention

Equations for determining electrostatic potential in the study of electromagnetism, or for determining pressure via Navier-Stokes equations in the study of incompressible fluid hydrodynamics, are collectively known by the form of Poisson equations. Further, properties of heat conduction or material diffusion can be defined by and follow equations known as diffusion equations. The present invention relates to a computational method for numerically calculating such Poisson equations, diffusion equations, or similar kinds of partial differential equations by means of a program for performing numerical calculation for simulation of physical phenomena or a program for performing design evaluation using such equations.

2. Description of the Related Art

Conventional known programs for calculating Poisson equations or diffusion equations have employed only the dependent variables of the equations per se. When the grid points on which such equations are operated are spaced at uniform intervals, a calculation having second order accuracy can be performed using center difference approximation. However, in the case of irregular intervals, computational accuracy with this known method has proven insufficient. Examples of a calculations involving the center difference approximation method are disclosed by C. A. J. Fletcher, "Computational Techniques for Fluid Dynamics," I, II, Springer-Verlag (1988).

Poisson equations or diffusion equations are calculated on the basis of certain given boundary conditions. In the case that the spatial geometry of shape to be defined by such boundary conditions is complex, or when irregular interval grid points are used, a problem arises in that boundary conditions of sufficient accuracy cannot be derived. Further, for equations in which a transform of space coordinates which are made to follow a given boundary is performed, wherein such equations employ regular interval grid points based on such transformed coordinates, i.e. boundary-fitted coordinates, it is frequently the case that considerable effort is necessary for implementing such equations in the case of a complex geometry, and the fact remains that extremely difficult cases are encountered which have resulted in major problems.

SUMMARY OF THE INVENTION

In the present invention, in order to solve with good accuracy a Poisson equation, diffusion equation or like partial differential equation performed on a plurality of grid points dispersed at irregular intervals, not only the values of the dependent variable of the original equations are used, but rather a program is created in which the first order derivatives thereof also are introduced independently as dependent variables, and discretized equations are generated by using discretized expressions for each of second and third order derivatives of the dependent variable of the original equation.

DETAILED DESCRIPTION OF THE PREFERRED EMBODIMENT

For further detailed understanding, the case of a one-dimensional space shall be described. For a dependent variable of a function (1) to be performed on an ith grid point, first order spatial derivatives thereof are derived as shown by function (2).

$$f_i \ldots \tag{1}$$

$$f_{x,i} \ldots \tag{2}$$

Figure 1:
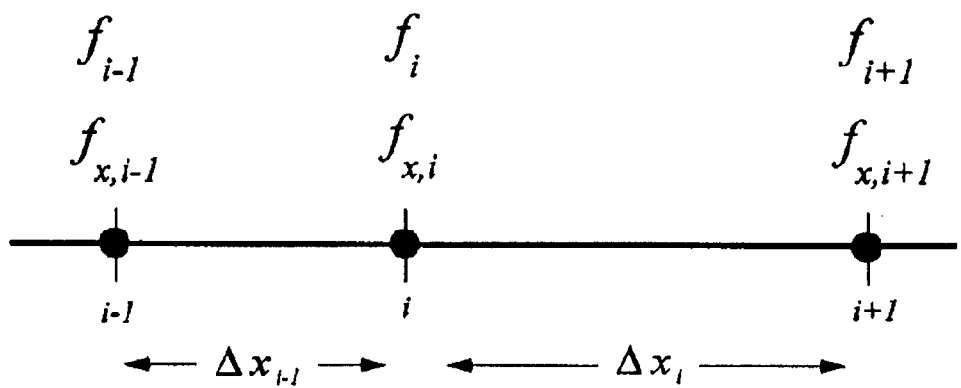
FIG. 1 shows an arrangement of a separation of space with grid points, for application on by the present invention.

As shown in FIG. 1, the right adjacent grid point i+1 to grid point i is taken at a position shifted in a positive direction only for grid interval (3), whereas the left adjacent grid point i−1 is taken at a position shifted in a negative direction only for grid interval (4).

$$\Delta x_i \ldots \tag{3}$$

$$\Delta x_{i-1} \ldots \tag{4}$$

Using values (5), second and third order space derivatives at a position of the ith grid point which is to be operated on can be represented with high accuracy as expressions (6) and (7).

$$f_{i-1}, f_{x,i-1}, f_i, f_{x,i}, f_{i+1}, f_{x,i+1} \ldots \tag{5}$$

$$\left(\frac{\partial^2 f}{\partial x^2}\right)_i = \left(\left(-10\frac{\Delta x_i^2}{\Delta x_{i-1}} + 6\frac{\Delta x_i^3}{\Delta x_{i-1}^2}\right)f_{i-1} + \right.$$

$$\left(10\frac{\Delta x_{i-1}^2}{\Delta x_i} - 6\frac{\Delta x_{i-1}^3}{\Delta x_i^2}\right)f_{i+1} +$$

$$\left(10\frac{\Delta x_i^2}{\Delta x_{i-1}} - 6\frac{\Delta x_i^3}{\Delta x_{i-1}^2} - 10\frac{\Delta x_{i-1}^2}{\Delta x_i} + 6\frac{\Delta x_{i-1}^3}{\Delta x_i^2}\right)f_i +$$

$$2\left(\Delta x_i^2 - \frac{\Delta x_i^3}{\Delta x_{i-1}}\right)f_{x,i-1} + 2\left(-\Delta x_{i-1}^2 + \frac{\Delta x_{i-1}^3}{\Delta x_i}\right)f_{x,i+1} +$$

$$\left.\left(8\Delta x_i^2 - 4\frac{\Delta x_i^3}{\Delta x_{i-1}} - 8\Delta x_{i-1}^2 + 4\frac{\Delta x_{i-1}^3}{\Delta x_i}\right)f_{x,i}\right) / (\Delta x_i - \Delta x_{i-1})^3 \tag{6}$$

$$\left(\frac{\partial^3 f}{\partial x^3}\right)_i = \left(\left(60\frac{\Delta x_i}{\Delta x_{i-1}} - 12\frac{\Delta x_i^2}{\Delta x_{i-1}^2} - 12\frac{\Delta x_i^3}{\Delta x_{i-1}^3}\right)f_{i-1} + \right.$$
$$\left(-60\frac{\Delta x_{i-1}}{\Delta x_i} + 12\frac{\Delta x_{i-1}^2}{\Delta x_i^2} + 12\frac{\Delta x_{i-1}^3}{\Delta x_i^3}\right)f_{i+1} +$$
$$\left(-60\frac{\Delta x_i}{\Delta x_{i-1}} + 12\frac{\Delta x_i^2}{\Delta x_{i-1}^2} + 12\frac{\Delta x_i^3}{\Delta x_{i-1}^3} + 60\frac{\Delta x_{i-1}}{\Delta x_i} - 12\frac{\Delta x_{i-1}^2}{\Delta x_i^2} - 12\frac{\Delta x_{i-1}^3}{\Delta x_i^3}\right)f_i +$$
$$\left(-12\Delta x_i + 6\frac{\Delta x_i^2}{\Delta x_{i-1}} + 6\frac{\Delta x_i^3}{\Delta x_{i-1}^2}\right)f_{x,i-1} +$$
$$\left(-48\Delta x_i + 6\frac{\Delta x_i^2}{\Delta x_{i-1}} + 6\frac{\Delta x_i^3}{\Delta x_{i-1}^2} + 48\Delta x_{i-1} - 6\frac{\Delta x_{i-1}^2}{\Delta x_i} - 6\frac{\Delta x_{i-1}^3}{\Delta x_i^2}\right)f_{x,i} +$$
$$\left.\left(12\Delta x_{i-1} - 6\frac{\Delta x_{i-1}^2}{\Delta x_i} - 6\frac{\Delta x_{i-1}^3}{\Delta x_i^2}\right)f_{x,i+1}\right) / (\Delta x_i - \Delta x_{i-1})^3 \quad (7)$$

As shown, using expressions (6) and (7), a Poisson equation, diffusion equation or like partial differential equation can be reduced into discretized equations, and a program for solving such discretized equations is generated. In the case of a multi-dimensional space, with respect to directions of space which differ from those shown in expressions (6) and (7), multiple calculations are used.

An embodiment by which the present invention is implemented shall now be described.

With respect to a calculation region made up from grid points dispersed at irregular intervals, a Poisson equation, diffusion equation or similar partial differential equation, which is suitable to be solved using expressions (6) and (7), is reduced into sets of discretized equations. The discretized equations can commonly be written as a large scale sparse matrix, wherein calculation on the matrix can be performed by an iterative relaxation method such as SOR (successive over-relaxation), a conjugate gradient method or the like, or by a direct method such as the Gauss elimination method. As the calculation result, values of the dependent variables on each of the grid points, along with first order spatial derivatives, are determined simultaneously. For examples of routines for calculation of sparse matrices by use of the above known methods, see J. R. Rice, "Matrix Computation and Mathematical Software," McGraw-Hill (1981) and J. J. Dongarra et al., "Solving Linear Systems on Vector and Share Memory Computers," SIAM, Philadelphia (1991). By expressing the actual calculation steps in FORTRAN or C/C++ programming language or the like, a computational program can be generated.

Figure 3:
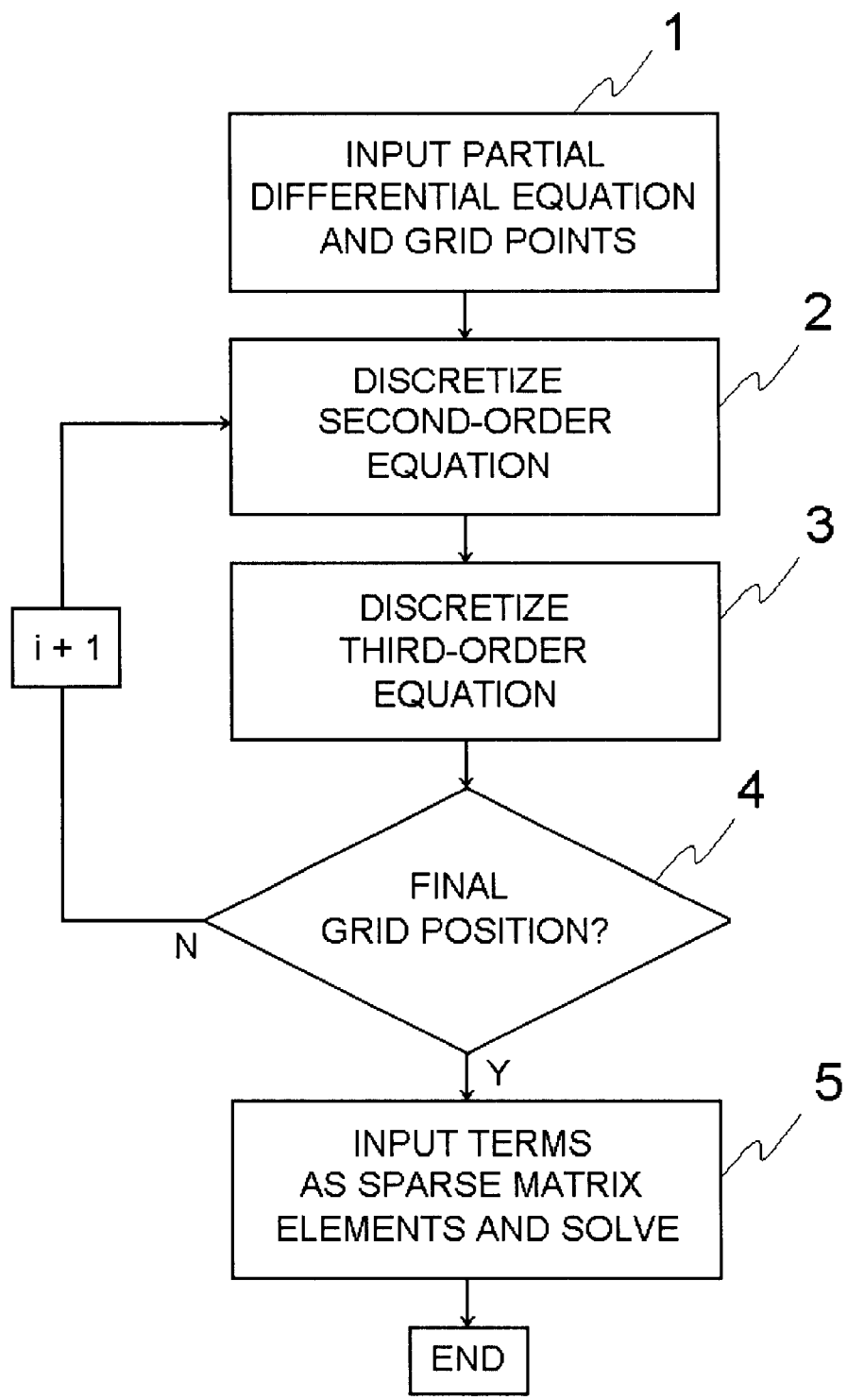
FIG. 3 is a flow diagram detailing the process steps implemented by the program generated according to the present invention.

An explanation shall now be given, with reference to the flow diagram shown in FIG. 3, of a method for practicing the present invention for generation of a computational program. Such a program may be stored as executable code on a storage medium, such as a hard disc drive HDD, and executed on a computer using standard techniques. When initiated, the computational program executes the following steps.

In STEP 1, a given Poisson equation, diffusion equation, or similar partial differential equation, for which the solution thereof (the function f) is yet unknown, or for which an easily discernable solution for the equation does not exist, is selected and input into a computer system by a known method, for example, keyboard input. Also at this time, grid position data made up of irregularly dispersed grid points and which represent a physical phenomena or state for which analysis is desired, are also input. Such data may be derived, for example, from a source of CAD/CAM data or the like, wherein as described in the background of the invention, such data typically describes a physical phenomena such as an electrostatic potential, fluid pressure, material temperature or material diffusion, which can be analyzed and described by the solution of a Poisson equation, Navier-Stokes equation, or a diffusion equation.

In STEP 2, about a given grid position, the equation is then reduced into a discretized equation on the basis of discretized expression (6). When performed on all grid points (see STEP 4), this results in a first set of discretized equations, wherein each of the discretized equations comprises a second order derivative of the dependent variable of the originally input partial differential equation at the grid point.

In STEP 3, a third order partial differential equation is yielded by differentiation of the equation, and the third order partial differential equation is similarly reduced into a discretized equation on the basis of discretized expression (7). When performed on all grid points (see STEP 4), this results in a second set of discretized equations, wherein each of the discretized equations comprises a third order derivative of the dependent variable of the input partial differential equation at the grid point.

In STEP 4, it is determined whether or not the final grid point of interest has been reached. If YES, the program proceeds to STEP 5. If NO, the grid number is incremented and the routine returns to the STEP 2, wherein the second and third steps are repeated about the next grid point until all grid points of interest have been subjected to the above-described discretization process.

In STEP 5, the second and third order derivatives, so derived as first and second sets of discretized equations, are then input as elements of a large scale sparse matrix or banded matrix, to be solved using a known computer executable algorithm, such as the SOR method, conjugate gradient method or Gauss elimination method, which may be employed as a sub-routine in the computer program of the present invention. The solution to the matrix gives the values of the dependent variables at the given grid points simultaneously together with the first order spatial derivatives on the given grid points, i.e. $f_i$, $f_{x,i}$, and so forth, in the discretized expressions (6) and (7), thus calculating approximate solutions to the original input equation at each of the grid points.

EXAMPLE 1

A program was generated for obtaining approximate numerical solutions of a one dimensional Poisson equation (8) within a given range (9) and subject to boundary conditions (10). Poisson equation (8) shown below represents a simple one-dimensional problem for which an exact analytical solution can be determined. Hence, with this example, by comparing the results achieved by the present invention with corresponding results obtained by the known center difference approximation method, and by comparison of these respective results against exact analytical solutions, the higher calculation accuracy attainable by the present invention can be demonstrated.

$$\frac{\partial^2 f}{\partial x^2} = \sin(2\pi x) \tag{8}$$

$$0 \leq x \leq 1 \ldots \tag{9}$$

$$f(0)=0, f(1)=0 \ldots \tag{10}$$

For purposes of comparison, it shall be understood that the Poisson equation (8) may be solved analytically by integrating the equation (8) on both sides twice and solving for f(x) as follows, $$f(x) = \frac{1}{4\pi^2}\sin(2\pi x) + Cx + D \tag{11}$$

where C and D are constants of integration which are determined by boundary conditions (10), and which for this simplified case results in C and D being zero, so that the solution to the Poisson equation is simply $$f(x) = \frac{1}{4\pi^2}\sin(2\pi x). \tag{12}$$

When respective grid positions $x_i$ are substituted into equation (12), an exact analytical solution of the Poisson equation (8) at the grid position is determined, as shown in the fourth column of Table I and used in equation (14), which shall be discussed in further detail below.

According to the present invention, for providing high accuracy approximate solutions for each grid position, the discretized expression (6) is applied to the left-hand second order derivative of Poisson equation (8) at each grid position, thereby generating the first set of discretized equations, and further the discretized expression (7) is applied to the left-hand third order derivative of equation (13) at each grid point, thereby generating the second set of discretized equations.

$$\frac{\partial^3 f}{\partial x^3} = 2\pi\cos(2\pi x) \tag{13}$$

Such discrete equations form a banded matrix, and a solution therefor can be solved using a Gauss elimination method.

In the case where equation (8) was reduced into discretized equations at equal intervals using the conventional center difference method with second order accuracy, and numerical solutions were determined, the calculation result produced an average error, when rounded to just under eight decimal places, of 0.0052805. The error at each grid point was evaluated, and an average error taken as a simple average over the number of all grid points was calculated according to equation (14).

$$\text{Error} = \frac{\text{Calculation Result} - \text{Analytical Solution}}{\text{Analytical Solution}} \tag{14}$$

Figure 2:
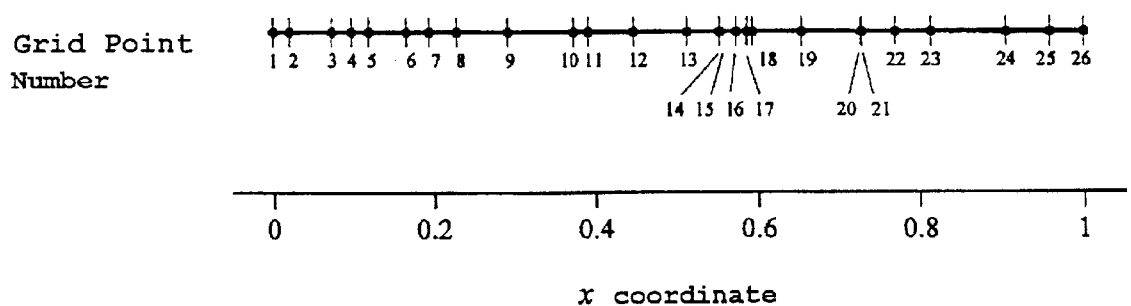
FIG. 2 shows an example of a highly irregular grid to which the teachings of the present invention are applied.

By contrast, an example of the present invention shall now be shown, with respect to a non-uniform interval grid, wherein equations (8) and (11) are reduced into discretized equations using expressions (6) and (7). Table 1 shows, for each grid point, the grid interval, calculation result for each grid point, a corresponding analytical solution determined in accordance with equation (12), the error at each grid point determined by equation (14), and at the bottom, the average error over all grid points. Further, FIG. 2 illustrates the grid points which were used in the calculations displayed by Table 1. Notwithstanding the existence of extremely irregular grid intervals, when the discretized expressions (6) and (7) of the present invention are used, the average error rounded to just under ten decimal places becomes 0.000050666. Thus, with the present invention, one is able to obtain a calculation result of remarkably higher accuracy than the case of the center difference method with second order accuracy.

TABLE 1

| Grid Point No. i | Grid Point Position $x_i$ | Grid Point Interval $\Delta x_i$ | Analytical Solution | Calculation Result | Relative Error |
|---|---|---|---|---|---|
| 1 | 0.00000 |  | 0.000000 | 0.000000 |  |
|  |  | 0.02049 |  |  |  |
| 2 | 0.02049 |  | −0.003253 | −0.003252 | $1.534 \times 10^{-5}$ |
|  |  | 0.05308 |  |  |  |
| 3 | 0.07357 |  | −0.011297 | −0.011297 | $3.173 \times 10^{-5}$ |
|  |  | 0.02439 |  |  |  |
| 4 | 0.09796 |  | −0.014626 | −0.014625 | $3.514 \times 10^{-5}$ |
|  |  | 0.02194 |  |  |  |
| 5 | 0.11991 |  | −0.017330 | −0.017329 | $3.770 \times 10^{-5}$ |
|  |  | 0.04646 |  |  |  |
| 6 | 0.16637 |  | −0.021915 | −0.021914 | $4.277 \times 10^{-5}$ |
|  |  | 0.02839 |  |  |  |
| 7 | 0.19477 |  | −0.023822 | −0.023821 | $4.625 \times 10^{-5}$ |
|  |  | 0.03357 |  |  |  |
| 8 | 0.22835 |  | −0.025098 | −0.025096 | $5.146 \times 10^{-5}$ |
|  |  | 0.06304 |  |  |  |
| 9 | 0.29140 |  | −0.024480 | −0.024478 | $6.270 \times 10^{-5}$ |
|  |  | 0.08199 |  |  |  |
| 10 | 0.37339 |  | −0.018092 | −0.018091 | $6.736 \times 10^{-5}$ |
|  |  | 0.01726 |  |  |  |

TABLE 1-continued

| Grid Point No. i | Grid Point Position $x_i$ | Grid Point Interval $\Delta x_i$ | Analytical Solution | Calculation Result | Relative Error |
|---|---|---|---|---|---|
| 11 | 0.39066 | | −0.016066 | −0.016065 | $6.777 \times 10^{-5}$ |
| | | 0.05642 | | | |
| 12 | 0.44708 | | −0.008269 | −0.008268 | $7.760 \times 10^{-5}$ |
| | | 0.06555 | | | |
| 13 | 0.51263 | | 0.002009 | 0.002009 | $2.997 \times 10^{-5}$ |
| | | 0.04013 | | | |
| 14 | 0.55277 | | 0.008246 | 0.008246 | $3.640 \times 10^{-5}$ |
| | | 0.00062 | | | |
| 15 | 0.55339 | | 0.008340 | 0.008340 | $3.666 \times 10^{-5}$ |
| | | 0.02022 | | | |
| 16 | 0.57362 | | 0.011305 | 0.011304 | $4.307 \times 10^{-5}$ |
| | | 0.01330 | | | |
| 17 | 0.58692 | | 0.013158 | 0.013157 | $4.606 \times 10^{-5}$ |
| | | 0.00673 | | | |
| 18 | 0.59365 | | 0.014061 | 0.014061 | $4.738 \times 10^{-5}$ |
| | | 0.06050 | | | |
| 19 | 0.65416 | | 0.020876 | 0.020875 | $5.593 \times 10^{-5}$ |
| | | 0.07282 | | | |
| 20 | 0.72698 | | 0.025067 | 0.025066 | $5.865 \times 10^{-5}$ |
| | | 0.00163 | | | |
| 21 | 0.72862 | | 0.025104 | 0.025102 | $5.871 \times 10^{-5}$ |
| | | 0.04140 | | | |
| 22 | 0.77003 | | 0.025131 | 0.025130 | $6.228 \times 10^{-5}$ |
| | | 0.04329 | | | |
| 23 | 0.81332 | | 0.023353 | 0.023352 | $7.002 \times 10^{-5}$ |
| | | 0.09148 | | | |
| 24 | 0.90480 | | 0.014264 | 0.014263 | $7.526 \times 10^{-5}$ |
| | | 0.05317 | | | |
| 25 | 0.95797 | | 0.006611 | 0.006611 | $5.979 \times 10^{-5}$ |
| | | 0.04202 | | | |
| 26 | 1.00000 | | 0.000000 | 0.000000 | |
| | | Average Error | | | $5.0666 \times 10^{-5}$ |

Figure 4:
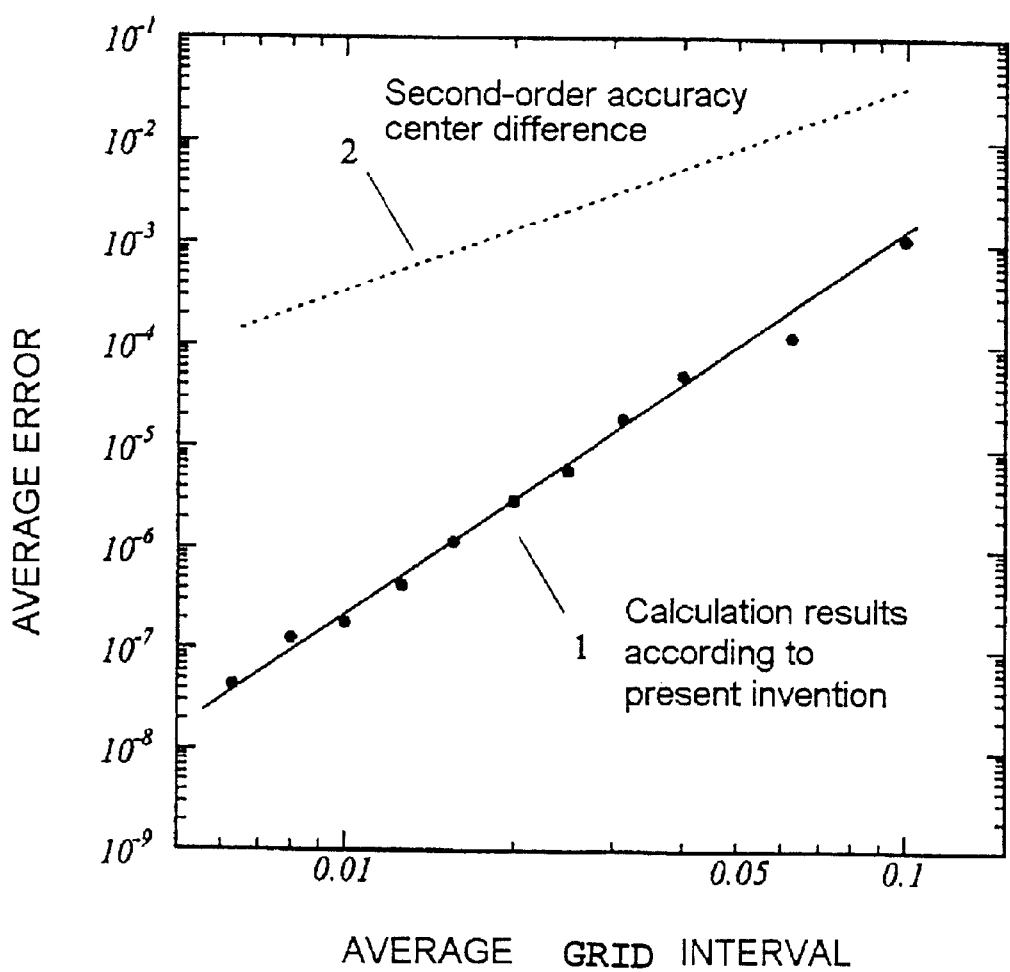
FIG. 4 is an example of a calculation result of a Poisson equation made use of by the present invention.

FIG. 2 and Table 1 illustrate a case in which only 26 grid points are used. However, in FIG. 4, for a non-uniform irregular grid of the same degree, a case is shown in which calculations were conducted and the average grid interval was changed in accordance with change of grid point number. The average grid interval is calculated according to equation (15).

$$\text{Avg. Grid Interval} = \frac{1}{(\text{Number of Total Grid Points} - 1)} \quad (15)$$

In the case of a diffusion equation, the equation is of a form in which first order time derivatives are introduced to a Poisson equation, and similarly to the case of a Poisson equation, it is possible to generate a program for calculating such equations. Even for analogous partial differential equations, in which source terms, first-order differential terms, other differential terms, variables, constants and the like are introduced to Poisson equations or diffusion equations, by application of discretized expressions for second and third order derivatives as taught herein, the present invention enables generation of a high accuracy numerical calculation program.

Effects and Technical Applicability of the Present Invention

Even in the case in which the region of calculation is discretely separated by an extremely irregular grid, owing to complex boundary conditions and the like, a numerical solution of 4th order spatial accuracy can be obtained with respect to a Poisson equation, diffusion equation or similar partial differential equation. Using such equations, because they may be directed to and express properties relating to electromagnetic field problems, phenomena of fluids, heat conduction and so forth, it becomes possible to attain high calculation accuracy in programs for numerical calculation of such phenomena. When the calculation region is divided out from an intersecting grid through introduction of a cut cell, complex boundary conditions and/or interfaces can be represented with high accuracy. However, for grid points adjacent to the cut cell, extremely irregular grid intervals result. According to the present invention, because highly accurate solutions to equations on such cut cells and even their adjacent grid points can be obtained, it is possible to create a program possessing great versatility.

The constants of discretized expressions (6) and (7) are not necessarily restricted to those shown herein, but such constants may be varied within a range of about 10%. Even if the constants of expressions (6) and (7) are varied within the range of 10%, the effect on the calculation result is small, and the calculation result according to the present invention is still more accurate than the case of the center difference method with second order accuracy.

What is claimed is:

1. A method for generating a program for numerical calculation on grid points dispersed at irregular intervals, to obtain an approximate solution to a given partial differential equation selected from a group of Poisson equations, diffusion equations, or analogous partial differential equations, in 1-, 2- or 3-dimensional space, said given partial differential equation describing a physical phenomena for determining physical quantities representing said phenomena in a physical medium at said grid points, comprising steps of:

generating a first set of discretized equations by using discretized expressions for second order derivatives of a dependent variable of said given partial differential equation on each of said grid points;

generating a second set of discretized equations by using discretized expressions for third order derivatives of said dependent variable on each of said grid points;

wherein each of said discretized expressions for the second and third order derivatives of said dependent variable comprises values of said dependent variables on said grid points;

embodying said first and second sets of discrete equations in an executable code stored on a computer readable medium; and executing said executable code to provide said approximate solution to said given partial differential equation.

2. The method according to claim 1, wherein said discretized expressions for said second and third order derivatives of said dependent variable of said given partial differential equation comprise terms of $f_{i-1}$, $f_i$, $f_{i+1}$, $f_{x,i-1}$, $f_{x,i}$ and $f_{x,i+1}$.

3. The method according to claim 2, wherein each of the terms of $f_{i-1}$, $f_i$, $f_{i+1}$, $f_{x,i-1}$, $f_{x,i}$ and $f_{x,i+1}$ comprises a coefficient including $\Delta x_{i-1}$ and $\Delta x$.

4. The method according to claim 3, wherein said discretized expressions for the second order derivatives of said dependent variable of said given partial differential equation are of the form $$\left(\frac{\partial^2 f}{\partial x^2}\right)_i = \left(\left(-10\frac{\Delta x_i^2}{\Delta x_{i-1}} + 6\frac{\Delta x_i^3}{\Delta x_{i-1}^2}\right)f_{i-1} + \right.$$

$$\left(10\frac{\Delta x_{i-1}^2}{\Delta x_i} - 6\frac{\Delta x_{i-1}^3}{\Delta x_i^2}\right)f_{i+1} +$$

$$\left(10\frac{\Delta x_i^2}{\Delta x_{i-1}} - 6\frac{\Delta x_i^3}{\Delta x_{i-1}^2} - 10\frac{\Delta x_{i-1}^2}{\Delta x_i} + 6\frac{\Delta x_{i-1}^3}{\Delta x_i^2}\right)f_i +$$

$$2\left(\Delta x_i^2 - \frac{\Delta x_i^3}{\Delta x_{i-1}}\right)f_{x,i-1} + 2\left(-\Delta x_{i-1}^2 + \frac{\Delta x_{i-1}^3}{\Delta x_i}\right)f_{x,i+1} +$$

$$\left.\left(8\Delta x_i^2 - 4\frac{\Delta x_i^3}{\Delta x_{i-1}} - 8\Delta x_{i-1}^2 + 4\frac{\Delta x_{i-1}^3}{\Delta x_i}\right)f_{x,i}\right) / (\Delta x_i - \Delta x_{i-1})^3;$$

and said discretized expressions for the third order derivatives of said dependent variable are of the form $$\left(\frac{\partial^3 f}{\partial x^3}\right)_i = \left(\left(60\frac{\Delta x_i}{\Delta x_{i-1}} - 12\frac{\Delta x_i^2}{\Delta x_{i-1}^2} - 12\frac{\Delta x_i^3}{\Delta x_{i-1}^3}\right)f_{i-1} + \right.$$

$$\left(-60\frac{\Delta x_{i-1}}{\Delta x_i} + 12\frac{\Delta x_{i-1}^2}{\Delta x_i^2} + 12\frac{\Delta x_{i-1}^3}{\Delta x_i^3}\right)f_{i+1} +$$

$$\left(-60\frac{\Delta x_i}{\Delta x_{i-1}} + 12\frac{\Delta x_i^2}{\Delta x_{i-1}^2} + 12\frac{\Delta x_i^3}{\Delta x_{i-1}^3} + 60\frac{\Delta x_{i-1}}{\Delta x_i} - 12\frac{\Delta x_{i-1}^2}{\Delta x_i^2} - 12\frac{\Delta x_{i-1}^3}{\Delta x_i^3}\right)f_i +$$

$$\left(-12\Delta x_i + 6\frac{\Delta x_i^2}{\Delta x_{i-1}} + 6\frac{\Delta x_i^3}{\Delta x_{i-1}^2}\right)f_{x,i-1} +$$

$$\left(-48\Delta x_i + 6\frac{\Delta x_i^2}{\Delta x_{i-1}} + 6\frac{\Delta x_i^3}{\Delta x_{i-1}^2} + 48\Delta x_{i-1} - 6\frac{\Delta x_{i-1}^2}{\Delta x_i} - 6\frac{\Delta x_{i-1}^3}{\Delta x_i^2}\right)f_{x,i} +$$

$$\left.\left(12\Delta x_{i-1} - 6\frac{\Delta x_{i-1}^2}{\Delta x_i} - 6\frac{\Delta x_{i-1}^3}{\Delta x_i^2}\right)f_{x,i+1}\right) / (\Delta x_i - \Delta x_{i-1})^3.$$

.

5. The method according to claim 4, wherein each of constants of said discretized expression are variable within a range of 10%.

6. The method according to claim 1, wherein said physical phenomenon is a pressure of a fluid through said physical medium.

7. The method according to claim 1, wherein said partial differential equation is a temperature profile through said up physical medium.

8. The method according to claim 1, wherein said physical phenomenon is a profile of an electromagnetic field in said physical medium.

9. The method according to claim 1, wherein said physical phenomenon is a distribution of a material diffused through said physical medium.

10. A computational method for solving a given partial differential equation selected from the group of Poisson equations, diffusion equations or analogous partial differential equations, describing a physical phenomena for determining physical quantites represented said phenomena in a physical medium at grid points dispersed at irregular intervals, comprising steps of:

inputting said given partial differential equation as analytical data to a computer processing apparatus;

inputting positional data of said irregularly dispersed grid positions, said positional data indicating a state of said physical phenomenon;

at each of said grid points, reducing said given partial differential equation into a first set of discretized equations by using discretized expressions for second order derivatives of a dependent variable of said given partial differential equation;

differentiating said given partial differential equation to yield a third order partial differential equation;

at each of said grid points, reducing said given partial differential equation into a second set of discretized equations by using discretized expressions for third order derivatives of said dependent variable;

inputting said second and third order derivatives in said first and second sets of discretized equations as elements of a matrix to be solved by an executable sub-routine in said computer processing apparatus, thereby providing an approximate solution to said given partial differential equation for estimating a physical quantity at each of said irregularly dispersed grid positions.

11. The method according to claim 10, wherein said physical phenomenon is a pressure of a fluid through said physical medium.

12. The method according to claim 10, wherein said partial differential equation is a temperature profile through said physical medium.

13. The method according to claim 10, wherein said physical phenomenon is a profile of an electromagnetic field in said physical medium.

14. The method according to claim 10, wherein said physical phenomenon is a distribution of a material diffused throughout said physical medium.

* * * * *